(12) United States Patent
Kopp et al.

(10) Patent No.: US 8,207,865 B2
(45) Date of Patent: Jun. 26, 2012

(54) METHOD OF REMOTE METERING OF ENERGY

(75) Inventors: Dieter Kopp, Illingen (DE); Janosch Wagner, Würzburg (DE); Klaus Stocker, Stuttgart (DE); Jonathan Vanderick, Brussels (BE)

(73) Assignee: Alcatel Lucent, Paris (FR)

( * ) Notice: Subject to any disclaimer, the term of this patent is extended or adjusted under 35 U.S.C. 154(b) by 612 days.

(21) Appl. No.: 12/396,607

(22) Filed: Mar. 3, 2009

(65) Prior Publication Data

US 2009/0224938 A1    Sep. 10, 2009

(30) Foreign Application Priority Data

Mar. 4, 2008    (EP) .................................... 08290211

(51) Int. Cl.
*G08C 19/16*    (2006.01)

(52) U.S. Cl. ............................. 340/870.02; 340/870.01

(58) Field of Classification Search ............. 340/870.02, 340/870.01
See application file for complete search history.

(56) References Cited

U.S. PATENT DOCUMENTS

| 7,248,978 | B2 | 7/2007 | Ransom et al. |
| 2003/0204756 | A1* | 10/2003 | Ransom et al. ............... 713/300 |
| 2005/0267898 | A1 | 12/2005 | Simon et al. |
| 2007/0096942 | A1 | 5/2007 | Kagan et al. |
| 2007/0136217 | A1 | 6/2007 | Johnson et al. |

OTHER PUBLICATIONS

European Search Report, Mar. 3, 2009.

* cited by examiner

*Primary Examiner* — Danny Nguyen

(74) *Attorney, Agent, or Firm* — Fay Sharpe LLP

(57) ABSTRACT

The invention concerns a method of remote metering of energy consumed and/or inputted by a plurality of energy consuming and/or inputting units (4) of a power grid (5) as well as a device for remote metering. Each unit (4) comprises at least one meter (2) and/or a meter box (1) connected with one or more meters (2) and the meter boxes (1) and/or the meters (2) are connected with at least one backend platform (3) via a communication network. At least two of the group of meter boxes (1), meters (2) and backend platforms (3) communicate with each other by means of a generic bi-directional resource management protocol on top of an IP protocol stack via the communication network and thereby encode and decode data transferred via the resource management protocol according to a predefined extensible specification comprising a functional group for meter information and control.

20 Claims, 15 Drawing Sheets

```
<SpecificData>
   <MFCT>Elster</MFCT>
   <Type>A1100</Type>
   <UniqueID> X1234D2123</UniqueID>
   <Medium>Electricity</Medium>
   <VersionID>2.45.02</VersionID>
   <Device>Consumtion</Device>
   <Mobile>Yes</Mobile>
   <Level>2.4</Level>
</SpecificData>
```

*Fig. 2*

```
<MeterEvent>
   <Event Name="Tamper">
      <Value>noManipulation</Value>
      <Time>2008-01-14 16-51-00Z</Time>
      <Timestamp>1200329460</Timestamp>
   </Event>
   <Event Name="Status">
      <Value>Active</Value>
      <Time>2008-01-14 16-51-00Z</Time>
      <Timestamp>1200329460</Timestamp>
   </Event>
   <Event Name="Supply">
      <Value>Active</Value>
      <Time>2008-01-14 16-51-00Z</Time>
      <Timestamp>1200329460</Timestamp>
   </Event>
</MeterEvent>
```

*Fig. 3*

```xml
<MeterData ID="00D04A000402">
  <Timestamp>1200393732</Timestamp>
  <Time>2008-01-15 10-42-12Z</Time>
  <Meter ADDR="3999993">
    <SpecificData>
      <MFCT>Elster</MFCT>
      <Type>A1100</Type>
      <UniqueID>X1234D2123</UniqueID>
      <Medium>Electricity</Medium>
      <VersionID>2.45.02</VersionID>
      <Device>consumption</Device>
      <Mobile>Yes</Mobile>
      <Level>2.4</Level>
      <Readings>12345</Readings>
    </SpecificData>
    <MeterEvent>
      <Event Name="Tamper">
        <Value>noManipulation</Value>
        <Time>2008-01-14 16-51-00Z</Time>
        <Timestamp>1200329460</Timestamp>
      </Event>
      <Event Name="Status">
        <Value>Active</Value>
        <Time>2008-01-14 16-51-00Z</Time>
        <Timestamp>1200329460</Timestamp>
      </Event>
      <Event Name="Supply">
        <Value>Active</Value>
        <Time>2008-01-14 16-51-00Z</Time>
        <Timestamp>1200329460</Timestamp>
      </Event>
    </MeterEvent>
    <Datapoint Name="EnergyTotal" ID="1.8.0">
      <Value>523.0400</Value>
      <Unit>kWh</Unit>
      <Timestamp>1200393720</Timestamp>
      <Time>2008-01-15 10-42-00Z</Time>
    </Datapoint>
    <Datapoint Name="Power" ID="1.7.0">
      <Value>-1</Value>
      <Unit>W</Unit>
      <Timestamp>1200393660</Timestamp>
      <Time>2008-01-15 10-41-00Z</Time>
    </Datapoint>
```

*Fig. 4a*

```xml
<Datapoint Name="Voltage" ID="32.7.0">
   <Value>227.8</Value>
   <Unit>V</Unit>
   <Timestamp>1200329460</Timestamp>
   <Time>2008-01-14 16-51-00Z</Time>
</Datapoint>
<Datapoint Name="Frequency" ID="34.7">
   <Value>50.03</Value>
   <Unit>Hz</Unit>
   <Timestamp>1200329460</Timestamp>
   <Time>2008-01-14 16-51-00Z</Time>
</Datapoint>
<Datapoint Name="Prepay" ID="54.0.16">
   <Value>999999</Value>
   <Unit>kWh</Unit>
   <Timestamp>1197909801</Timestamp>
   <Time>2007-12-17 16-43-21Z</Time>
   <Age>81s</Age>
</Datapoint>
<Datapoint Name="IMC" ID="54.0.8">
   <Value>174833</Value>
   <Unit>ID</Unit>
   <Timestamp>1197909801</Timestamp>
   <Time>2007-12-17 16-43-21Z</Time>
   <Age>81s</Age>
</Datapoint>
</Meter>
</MeterData>
```

*Fig. 4b*

```
<MeterData ID="00D04A000402">
  <Meter ADDR="91029595">
    <Datapoint Name="Charge" ID="54.0.128">
      <Value>0.1433</Value>
      <Unit>Euro/kWh</Unit>
      <Timestamp>1197909801</Timestamp>
      <Time>2007-12-17 16-43-21Z</Time>
    </Datapoint>
  </Meter>
</MeterData>
```

*Fig. 5*

```
<MeterData ID="00D04A000402">
  <Meter ADDR="91029595">
    <update>
      <header>3203012910</header>
      <data>2123143242</data>
      <version>2.15.6</version>
    </update>
  </Meter>
</MeterData>
```

*Fig. 6*

```
<MeterData ID="00D04A000402">
  <Box ADDR="91029595">
    <update>
      <header>934589</header>
      <data>2123143242</data>
      <version>2.15.6</version>
    </update>
  </Box>
</MeterData>
```

*Fig. 7*

```
<IMC>
  <mobileID> X1234D2138</mobileID>
  <Datapoint Name="EnergyTotal" ID="1.8.0">
    <Value>523.0400</Value>
    <Unit>kWh</Unit>
    <Timestamp>1200393720</Timestamp>
    <Time>2008-01-15 10-42-00Z</Time>
  </Datapoint>
  <Datapoint Name="Power" ID="1.7.0">
    <Value>-1</Value>
    <Unit>W</Unit>
    <Timestamp>1200393660</Timestamp>
    <Time>2008-01-15 10-41-00Z</Time>
  </Datapoint>
</IMC>
```

*Fig. 8*

```
<ConsumptionDetection ID="54.0.2">
  <Timestamp>1200393720</Timestamp>
  <Time>2008-01-15 10-42-00Z</Time>
  <Consumer name="TV" ID="54.0.2.1">
    <Datapoint Name="EnergyTotal" ID="1.8.0">
      <Value>523.0400</Value>
      <Unit>kWh</Unit>
      <Timestamp>1200393720</Timestamp>
      <Time>2008-01-15 10-42-00Z</Time>
    </Datapoint>
    <Datapoint Name="Power" ID="1.7.0">
      <Value>-1</Value>
      <Unit>W</Unit>
      <Timestamp>1200393660</Timestamp>
      <Time>2008-01-15 10-41-00Z</Time>
    </Datapoint>
     <Status>1</Status>
  </Consumer>
</ConsumptionDetection>
```

*Fig. 9*

```
<Setting ApplianceID="1">
  <State>On</State>
  <Dimming>180s</Dimming>
  <Time>1200393660</Time>
  <Timestamp>2008-01-15 10-41-00Z</Timestamp>
</Setting>
```

*Fig. 10*

```
<Control AirCondition="1">
  <State>On</State>
  <Temperature>21</Temperature>
  <Unit>C</Unit>
  <Time>1200393660</Time>
  <Timestamp>2008-01-15 10-41-00Z </Timestamp>
</Control>

<Control Heating="1">
  <State>Off</State>
  <Temperature>21</Temperature>
  <Unit>C</Unit>
  <Time>1200393660</Time>
  <Timestamp>2008-01-15 10-41-00Z </Timestamp>
</Control>
```

*Fig. 11*

```
<Setting TemperatureSystem="15.5" >
  <State AirCondition="1">On</State>
  <State AirCondition="2">On</State>
  <State Heating="1">Off</State>
  <State Heating="2">Off</State>
  <Temperature>20</Temperature>
  <Unit>C</Unit>
  <Time>1200393660</Time>
  <Timestamp>2008-01-15 10-41-00Z</Timestamp>
</Setting>
```

*Fig. 12*

```
<Setting AlarmID="1">
    <State>On</State>
    <Time>1200393660</Time>
    <Timestamp>2008-01-15 10-41-00Z</Timestamp>
</Setting>
```

*Fig. 13*

```
<Setting AlarmSystem="15.5" >
    <State AlarmID="1">On/Off/Alarm</State>
    <State AlarmID="1">On/Off/Alarm</State>
    <Time>1200393660</Time>
    <Timestamp>2008-01-15 10-41-00Z</Timestamp>
</Setting>
```

*Fig. 14*

```
<AccessControl ID="2">
    <Setting AccessID="1">
        <Value>83abc07d9d3120f2447ed554h7576f5</Value>
        <Unit>Eyescan/UserID/FingerPrint</unit>
        <Login>
            <Abundance>everytime/every/weekly/daily</Abundance>
            <StartTime>2007-12-19 13-35-06Z</StartTime>
            <StopTime>2007-12-22 14-45-09Z</StopTime>
        </Login>
    </Setting>
    <TotalLock>on/off</TotalLock>
</AccessControl>
```

*Fig. 15*

```
<AccessControl ID="2">
  <Status AccessID="1">
    <Value>83abc07d9d3120f2447ed554h7576f5</Value>
    <Unit>Eyescan/UserID/FingerPrint</Unit>
    <Logedin>
       <Time>2007-12-19 13-35-06Z</Time>
       <Time>2007-12-22 14-45-09Z</Time>
    </Logedin>
  </Status>
  <TotalLock>on/off</TotalLock>
</AccessControl>
```

*Fig. 16*

```
<ConsumptionDetection ID="54.0.2">
  <Timestamp>1200393720</Timestamp>
  <Time>2008-01-15 10-42-00Z</Time>
   <Consumer name="TV" ID="54.0.2.1">
     <Datapoint Name="EnergyTotal" ID="1.8.0">
       <Value>523.0400</Value>
       <Unit>kWh</Unit>
       <Timestamp>1200393720</Timestamp>
       <Time>2008-01-15 10-42-00Z</Time>
     </Datapoint>
     <Datapoint Name="Power" ID="1.7.0">
       <Value>-1</Value>
       <Unit>W</Unit>
       <Timestamp>1200393660</Timestamp>
       <Time>2008-01-15 10-41-00Z</Time>
     </Datapoint>
      <Status>1</Status>
   </Consumer>
</ConsumptionDetection>
```

*Fig. 17*

```xml
<MeterData ID="00D04A000402">
   <Timestamp>1200393732</Timestamp>
   <Time>2008-01-15 10-42-12Z</Time>
   <Meter ADDR="3999993">
      <SpecificData>
         <MFCT>Elster</MFCT>
         <Type>A1100</Type>
         <UniqueID>X1234D2123</UniqueID>
         <Medium>Electricity</Medium>
         <VersionID>2.45.02</VersionID>
         <Device>Input</Device>
         <Mobile>No</Mobile>
         <Level>2.4</Level>
         <Readings>12345</Readings>
      </SpecificData>
      <MeterEvent>
         <Event Name="Tamper">
            <Value>noManipulation</Value>
            <Time>2008-01-14 16-51-00Z</Time>
            <Timestamp>1200329460</Timestamp>
         </Event>
         <Event Name="Status">
            <Value>Active</Value>
            <Time>2008-01-14 16-51-00Z</Time>
            <Timestamp>1200329460</Timestamp>
         </Event>
         <Event Name="Supply">
            <Value>Active</Value>
            <Time>2008-01-14 16-51-00Z</Time>
            <Timestamp>1200329460</Timestamp>
         </Event>
      </MeterEvent>
      <Datapoint Name="EnergyTotal" ID="1.8.0">
         <Value>523.0400</Value>
         <Unit>kWh</Unit>
         <Timestamp>1200393720</Timestamp>
         <Time>2008-01-15 10-42-00Z</Time>
      </Datapoint>
      <Datapoint Name="Power" ID="1.7.0">
         <Value>-1</Value>
         <Unit>W</Unit>
         <Timestamp>1200393660</Timestamp>
         <Time>2008-01-15 10-41-00Z</Time>
      </Datapoint>
```

*Fig. 18a*

```
<Datapoint Name="Voltage" ID="32.7.0">
    <Value>227.8</Value>
    <Unit>V</Unit>
    <Timestamp>1200329460</Timestamp>
    <Time>2008-01-14 16-51-00Z</Time>
</Datapoint>
<Datapoint Name="Frequency" ID="34.7">
    <Value>50.03</Value>
    <Unit>Hz</Unit>
    <Timestamp>1200329460</Timestamp>
    <Time>2008-01-14 16-51-00Z</Time>
</Datapoint>
</Meter>
</MeterData>
```

*Fig. 18b*

```
<MeterData ID="00D04A000402">
    <Timestamp>1200393732</Timestamp>
    <Time>2008-01-15 10-42-12Z</Time>
    <Meter ADDR="3999993">
        <Setting SolarPlantID="1">
            <State>On</State>
            <Time>1200393660</Time>
            <Timestamp>2008-01-15 10-41-00Z</Timestamp>
        </Setting>
    </Meter>
</MeterData>
```

*Fig. 19*

```xml
<MeterData ID="00D04A000402">
   <Timestamp>1200393732</Timestamp>
   <Time>2008-01-15 10-42-12Z</Time>
   <Meter ADDR="3999993">
      <SpecificData>
         <MFCT>Elster</MFCT>
         <Type>A1100</Type>
         <UniqueID>X1234D2123</UniqueID>
         <Medium>Electricity</Medium>
         <VersionID>2.45.02</VersionID>
         <Device>consumption</Device>
         <Mobile>No</Mobile>
         <Level>2.4</Level>
         <Readings>12345</Readings>
      </SpecificData>
      <MeterEvent>
         <Event Name="Tamper">
            <Value>noManipulation</Value>
            <Time>2008-01-14 16-51-00Z</Time>
            <Timestamp>1200329460</Timestamp>
         </Event>
         <Event Name="Status">
            <Value>Active</Value>
            <Time>2008-01-14 16-51-00Z</Time>
            <Timestamp>1200329460</Timestamp>
         </Event>
         <Event Name="Supply">
            <Value>Active</Value>
            <Time>2008-01-14 16-51-00Z</Time>
            <Timestamp>1200329460</Timestamp>
         </Event>
      </MeterEvent>
      <Datapoint Name="EnergyTotal" ID="1.8.0">
         <Value>523.0400</Value>
         <Unit>kWh</Unit>
         <Timestamp>1200393720</Timestamp>
         <Time>2008-01-15 10-42-00Z</Time>
      </Datapoint>
      <Datapoint Name="Power" ID="1.7.0">
         <Value>-1</Value>
         <Unit>W</Unit>
         <Timestamp>1200393660</Timestamp>
         <Time>2008-01-15 10-41-00Z</Time>
      </Datapoint>
      <Datapoint Name="Voltage" ID="32.7.0">
         <Value>227.8</Value>
         <Unit>V</Unit>
         <Timestamp>1200329460</Timestamp>
         <Time>2008-01-14 16-51-00Z</Time>
      </Datapoint>
```

*Fig. 20a*

```xml
<Datapoint Name="Frequency" ID="34.7">
    <Value>50.03</Value>
    <Unit>Hz</Unit>
    <Timestamp>1200329460</Timestamp>
    <Time>2008-01-14 16-51-00Z</Time>
</Datapoint>
<Datapoint Name="Prepay" ID="54.0.16">
    <Value>999999</Value>
    <Unit>kWh</Unit>
    <Timestamp>1197909801</Timestamp>
    <Time>2007-12-17 16-43-21Z</Time>
    <Age>81s</Age>
</Datapoint>
<IMC>
    <mobileID> X1234D2138</mobileID>
    <Datapoint Name="EnergyTotal" ID="1.8.0">
        <Value>523.0400</Value>
        <Unit>kWh</Unit>
        <Timestamp>1200393720</Timestamp>
        <Time>2008-01-15 10-42-00Z</Time>
    </Datapoint>
    <Datapoint Name="Power" ID="1.7.0">
        <Value>-1</Value>
        <Unit>W</Unit>
        <Timestamp>1200393660</Timestamp>
        <Time>2008-01-15 10-41-00Z</Time>
    </Datapoint>
</IMC>
</Meter>
<Home>
    <ConsumptionDetection ID="54.0.2">
        <Timestamp>1200393720</Timestamp>
        <Time>2008-01-15 10-42-00Z</Time>
        <Consumer name="TV" ID="54.0.2.1">
            <Datapoint Name="EnergyTotal" ID="1.8.0">
                <Value>523.0400</Value>
                <Unit>kWh</Unit>
                <Timestamp>1200393720</Timestamp>
                <Time>2008-01-15 10-42-00Z</Time>
            </Datapoint>
            <Datapoint Name="Power" ID="1.7.0">
                <Value>-1</Value>
                <Unit>W</Unit>
                <Timestamp>1200393660</Timestamp>
                <Time>2008-01-15 10-41-00Z</Time>
            </Datapoint>
            <Status>1</Status>
        </Consumer>
    </ConsumptionDetection>
```

*Fig. 20b*

```xml
<Setting TemperatureSystem="15.5" >
    <State AirCondition="1">On</State>
    <State AirCondition="2">On</State>
    <State Heating="1">Off</State>
    <State Heating="2">Off</State>
    <Temperature>20</Temperature>
    <Unit>C</Unit>
    <Time>1200393660</Time>
    <Timestamp>2008-01-15 10-41-00Z</Timestamp>
</Setting>
<Setting AlarmSystem="15.5" >
    <State AlarmID="1">On/Off/Alarm</State>
    <State AlarmID="1">On/Off/Alarm</State>
    <Time>1200393660</Time>
    <Timestamp>2008-01-15 10-41-00Z</Timestamp>
</Setting>
<AccessControl ID="2">
    <Status AccessID="1">
        <Value>83abc07d9d3120f2447ed554h7576f5</Value>
        <Unit>Eyescan/UserID/FingerPrint</Unit>
        <Logedin>
            <Time>2007-12-19 13-35-06Z</Time>
            <Time>2007-12-22 14-45-09Z</Time>
        </Logedin>
    </Status>
    <TotalLock>on/off</TotalLock>
</AccessControl>
</Home>
</MeterData>
```

*Fig. 20c*

```xml
<MeterData ID="00D04A000402">
    <Meter ADDR="91029595">
        <Datapoint Name="Charge" ID="54.0.128">
            <Value>0.1433</Value>
            <Unit>Euro/kWh</Unit>
            <Timestamp>1197909801</Timestamp>
            <Time>2007-12-17 16-43-21Z</Time>
        </Datapoint>
      <update>
        <header>3203012910</header>
        <data>2123143242</data>
        <version>2.15.6</version>
      </update>
    </Meter>
```

*Fig. 21a*

```
<Home>
    <Setting ApplianceID="1">
        <State>On</State>
        <Dimming>180s</Dimming>
        <Time>1200393660</Time>
        <Timestamp>2008-01-15 10-41-00Z</Timestamp>
    </Setting>
    <Control AirCondition="1">
        <State>On</State>
        <Temperature>21</Temperature>
        <Unit>C</Unit>
        <Time>1200393660</Time>
        <Timestamp>2008-01-15 10-41-00Z </Timestamp>
    </Control>
    <Control Heating="1">
        <State>Off</State>
        <Temperature>21</Temperature>
        <Unit>C</Unit>
        <Time>1200393660</Time>
        <Timestamp>2008-01-15 10-41-00Z </Timestamp>
    </Control>
    <Setting AlarmID="1">
        <State>On</State>
        <Time>1200393660</Time>
        <Timestamp>2008-01-15 10-41-00Z</Timestamp>
    </Setting>
    <AccessControl ID="2">
        <Setting AccessID="1">
            <Value>83abc07d9d3120f2447ed554h7576f5</Value>
            <Unit>Eyescan/UserID/FingerPrint</unit>
            <Login>
                <Abundance>everytime/every/weekly/daily</Abundance>
                <StartTime>2007-12-19 13-35-06Z</StartTime>
                <StopTime>2007-12-22 14-45-09Z</StopTime>
            </Login>
        </Setting>
        <TotalLock>on/off</TotalLock>
    </AccessControl>
</Home>
</MeterData>
```

*Fig. 21b*

METHOD OF REMOTE METERING OF ENERGY

BACKGROUND OF THE INVENTION

The invention is based on a priority application EP08290211.5 which is hereby incorporated by reference.

The present invention relates to a method of remote metering of energy consumed and/or inputted by a plurality of energy consuming and/or inputting units of a power grid and a corresponding device for remote metering of energy.

Metering devices for metering of energy are an essential part of a power grid. These devices are located at the consumer side, e.g. in private households. The power grid connects the energy consuming and energy generating devices of a respective unit, for instance a private household, with the utilities of an energy provider, for instance a power plant. A metering device located at the premises of a respective unit measures the energy the respective unit receives from and/or inputs in the power grid. The energy provider uses the measured metering data for bill purposes, but this metering data measured with the metering devices is not directly available to the energy provider.

US 2007/0136217 A1 describes a terminal and a method for providing electricity pricing information to a consumer. The terminal comprises a receiver for receiving pricing information transmitted from an electricity supplier to the terminal and a processor for analyzing said pricing information. The processor compares its analyses of the data with predefined settings and/or rule sets. Furthermore the processor controls a number of functions of one or more appliance of the consumer based on such processing.

The object of the present invention is to improve the metering of energy consumed and or inputted by units of a power grid.

SUMMARY OF THE INVENTION

The object of the present invention is achieved by a method of remote metering of energy consumed and/or inputted by a plurality of energy consuming and/or inputting units of a power grid, wherein each unit comprises at least one meter and/or a meter box connected with one or more meters and the meter boxes and/or the meters are connected with at least one backend platform via a communication network, whereby at least two of the group of meter boxes, meters and backend platforms communicate with each other by means of a generic bi-directional resource management protocol on top of an IP protocol stack via the communication network and thereby encode and decode data transferred via the resource management protocol according to a predefined extensible specification comprising a functional group for meter information and control. The object of the present invention is also achieved by a device for remote metering of energy consumed and/or inputted by one of a plurality of energy consuming and/or inputting units of a power grid, in particular a meter or a meter box, whereby the device comprises communication means adapted to communicate via an communication network by means of a generic bi-directional resource management protocol on top of an IP protocol stack with a backend platform or with another device for remote metering of energy consumed and/or inputted by one of the plurality of energy consuming and/or inputting units of the power grid and thereby encode and decode the data transferred via the resource management protocol according to an predefined extensible specification comprising a functional group for meter information and control.

The present invention provides a powerful mean to exchange meter information and a plurality of further information in a hardware independent way. The predefined extensible specification provides the ability to adapt and extend the information transfer process to further functionalities, e.g. with regard to home automation and energy input, for example from wind turbines or other kind of decentralized energy generation, without loosing the ability to communicate with a simple smart meter. It is possible to extend the predefined extensible specification with additional data elements which provide further functions for control and/or information. The generic bi-directional resource management protocol is on top of the IP layer (IP=Internet Protocol) and therefore any physical communication technology where an IP stack is available can be used. Furthermore, metering information specified by means of the predefined extensible specification can be communicated in short packages which have an average size of less than 1 Kilo Byte and/or a size of less than 4 Kilo Byte and therefore only a small bandwidth of the communication network is required. Thus the generic bi-directional resource management protocol is able to transfer metering data independent of the individual functional range and constraints of the respective meter, backend platform and energy provider in a generic way and enables the interaction between a plurality of different, individually adapted entities.

Further advantages are achieved by embodiments of the invention indicated by the dependent claims.

Preferably, the data transferred via the generic bi-directional resource management protocol comprises a digital signature or encoded by means of a digital signature. For example, the data encoded according to the predefined extensible specification is in a second step encoded by means of a digital signature. The digital signature can be generated according to an MD5 standard. The digital signature allows the meter 2, 21, the meter box 1 and/or the platform 3 to verify the content and completeness of transferred data. The digital signature can apply to single data elements of the transferred data or to all data of the transferred data.

According to a preferred embodiment of the invention the functional group for meter information and control comprises a data element for specifying a meter, and a data element for specifying meter events. The transfer of these data elements helps to improve the routing of energy through the power grid and to improve the consumption clearing process at the side of the backend platform or energy provider.

Preferably, the data element for specifying the meter comprises a data element for specifying a medium measured by the meter, in particular electricity, gas, heating or water.

Preferably, the data element for specifying the meter comprises a data element specifying the level of a meter in the hierarchy of a meter topology. The meter topology indicates the interconnections or links between meters or meter boxes. This improves the ability of the energy provider to use the meter data for advanced consumption clearing process between subscriber and advanced routing of energy through the power grid.

According to a preferred embodiment of the invention the data element for specifying the meter comprises a data element indicating if the unit is a mobile unit. This data element is used to identify the ability of a meter to change its location and therefore its place in the meter topology. Such change could affect the metering of energy and routing of energy in the power grid, and could therefore be used as trigger point for execution of specific consumption clearing and energy routing procedures.

Furthermore it is possible, that the data element for specifying the meter comprises a data element indicating whether the unit assigned to the meter or meter box consumes or inputs energy into the power grid.

Preferably, the data element for specifying the meter events comprises a data element indicating attempts of manipulation and a data element indicating the meter status. These data elements assist the energy provider in maintenance of the meters or meter boxes and also supports the consumption clearing process at the backend platform.

According to a preferred embodiment of the invention the functional group for meter information and control comprises an extendable data element for specifying data transferable from and to the meter and comprises in particular a data element for measured power, voltage, frequency, and total energy, inter meter communication, prepayment and/or charge. In particular, the data elements for prepayment and/or charge enables a quicker and simpler consumption clearing at the backend platform, new forms of consumption clearing and the transfer of charge information to consumers.

Preferably, the functional group for meter information and control comprises a data element for transfer update data to the meter. Such a data element supports remote maintenance of the meters and/or the meter boxes in case non-hardware upgrade of the meters and/or the meter boxes, is necessary.

According to a preferred embodiment of the invention the functional group for meter information and control comprises a data element for inter mobile communication.

According to a preferred embodiment of the invention the functional group for meter information and control comprises a data element for connecting and disconnecting the unit from the power grid. This facilitates the disconnection of units, i.e. consumers, from the power grid, in case that no credit is available to cover the consumption clearing of the consumer and/or the disconnection of a unit in dependence of the respective tariff chosen by the consumer. Moreover, it also improves the routing of energy through the power grid and enables load balancing of the power grid.

Preferably, the functional group for meter information and control comprises a data element for limiting a power consumption of the consumer. The data element for limiting the power consumption specifies the maximum amount of energy for a given period of time, preferably in units of kWh/h available for energy consumption by the consumer. For instance, this guarantees consumers of the energy provider to have a minimum of vital need of energy available. It is also possible that the extendable data element has an attribute for specifying such information (for instance in conjunction with data elements for charge/prepayment) or that the data element for specifying the meter comprises such data element.

According to a preferred embodiment of the invention the predefined extensible specification comprises a functional group for home automation. Thus, the generic bi-directional resource management protocol provides a common infrastructure for both, metering and home automation.

According to a preferred embodiment of the invention the functional group for home automation comprises a data element for consumption detection and a data element for device control. The data elements for consumption detection and for device control makes it possible to adapt the power grid as well as devices controlled by Home Automation to current need of the consumers. Furthermore security features, like access controls, locks and/or alarms, can be controlled and maintained by a single provider.

Preferably, the communication network comprises one or more physical communication technologies whereupon an IP stack is provided on, e.g. Power Line Communication, Ethernet, bluetooth, GRPS (GRPS=General Packet Radio Service), UMTS (UMTS=Universal Mobile Telecommunications System), DSL (DSL=Digital Subscriber Line), WiMax (WiMax=Worldwide Interoperability for Microwave Access), WLAN (WLAN=Wireless Local Area Network) or ZigBee. Preferably, data encoded according to the predefined extensible specification is transferred by means of the SOAP Protocol (SOAP=Simple Object Access Protocol) between the meter, the meter box and/or the backend platform.

These as well as further features and advantages of the invention will be better appreciated by reading the following detailed description of presently preferred exemplary embodiments taken with the accompanying drawing of:

FIG. 2 shows a specification of a data element filled with exemplary data for specifying a meter.

FIG. 3 shows a specification of a data element filled with exemplary data for specifying a meter event.

FIG. 4a shows a specification filled with exemplary data for specifying a meter, meter events and data of a meter.

FIG. 4b shows the continuation of FIG. 4a.

FIG. 5 shows a specification filled with exemplary data for providing charge information to the meter.

FIG. 6 shows a specification filled with exemplary data for providing update information to the meter.

FIG. 7 shows a specification filled with exemplary data for providing update information to the meter box.

FIG. 8 shows a specification of a data element filled with exemplary data for inter meter communication.

FIG. 9 shows a specification of a data element filled with exemplary data for providing consumption detection directed to the backend platform 3.

FIG. 10 shows a specification of a data element filled with exemplary data for device control.

FIG. 11 shows a specification of a data element filled with exemplary data for controlling air condition and a heating.

FIG. 12 shows a specification of a data element filled with exemplary data for activating two air conditions.

FIG. 13 shows a first example of a specification of a data element filled with exemplary data for controlling an alarm system.

FIG. 14 shows a second example of a specification of a data element filled with exemplary data for controlling an alarm system.

FIG. 15 shows a specification of a data element filled with exemplary data for providing access control.

FIG. 16 shows a specification of a data element filled with exemplary data for providing access control.

FIG. 17 shows a specification of a data element for consumption detection filled with exemplary data to announce a demand of energy.

FIG. 18a shows a specification filled with exemplary data for specifying a meter, meter events and further data in case of a unit that inputs energy in the power grid.

FIG. 18b shows the continuation of FIG. 18a.

FIG. 19 shows a specification of a data element filled with exemplary data for controlling a solar power plant.

FIG. 20a shows a specification filled with exemplary data which is sent from the backend platform to the meter box.

FIG. 20b shows the continuation of FIG. 20a.

FIG. 20c shows the continuation of FIG. 20b.

FIG. 21a shows a specification filled with exemplary data which is sent from the meter box to the backend platform.

FIG. 21b shows the continuation of FIG. 21a.

Figure 1:
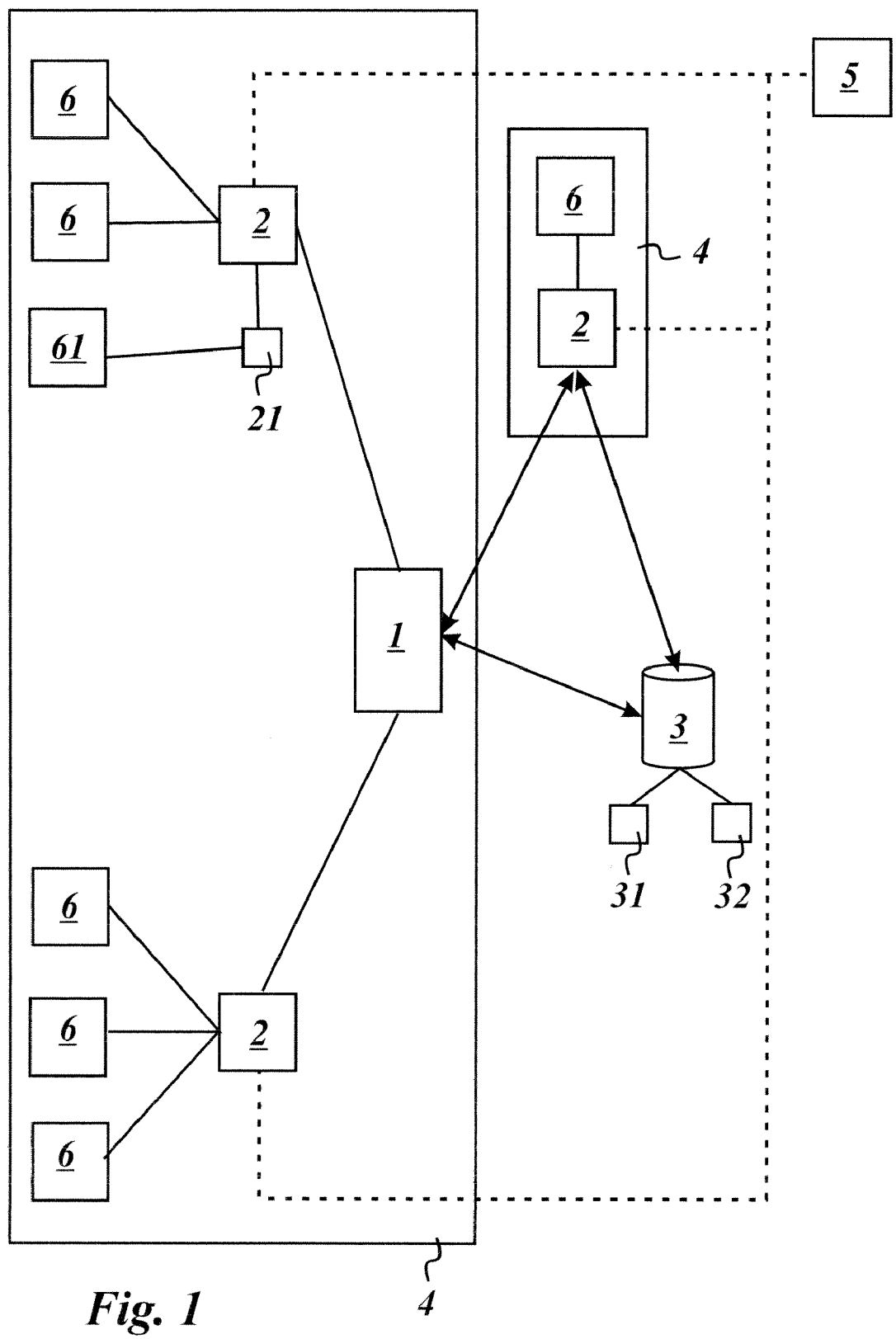
FIG. 1 shows a schematic sketch of a plurality of energy consuming and/or inputting units of a power grid, wherein each unit comprises at least one meter and/or a meter box connected with one or more meters and the meter boxes and/or the meters are connected with at least one backend platform via a communication network.

FIG. 1 shows a schematic sketch of a power grid environment. The power grid environment comprises a power grid 5, units 4 which are subscribed to an energy provider and a backend platform 3 of an energy provider. The units 4 consume energy from and/or input energy in the power grid 5. Each unit 4 has at least one meter which measures energy consumed from or inputted in the power grid by the respective unit 4. The backend platform 3 gathers data about the energy consuming and/or inputting of the units 4.

The power grid 5 interconnects the units 4 through power lines and is connected with plurality of further power consuming and/or inputting units, e.g. a power plant (not shown). The power lines are indicated in FIG. 1 by dashed lines.

The one of the two units 4 shown in FIG. 1 comprises one energy consuming entity 6, for instance a group of household appliances 6, and a meter 2. The meter 2 is at the one end electrically connected with the power grid 5 and at the other end electrically connected with the energy consuming entity 6. The meter 2 measure the energy received from the power grid 5 and/or inputted in the power grid 5. Furthermore, the meter 2 comprises communication means for communicating via an IP protocol stack with the backend platform 3.

The other one of the two units 4 shown in FIG. 1 comprises five energy consuming entities 6 and one mobile energy consuming entity 61, two meters 2, a mobile meter 21, and a meter box 1. The meters 2 are at the one end electrically connected with the power grid 5 and at the other end connected with the respective entities 6. As described above, the energy consuming entities 6 and 61 consume energy from the power grid 5 and/or input energy in the power grid 5. Energy consuming entities 6 are, for instance, households and devices therein, like air-conditions, alarm systems, central locks, etc., power generators, like solar plants or wind turbines, or electrical cars. Furthermore, the mobile meter 21 is connected through a meter 2 with the meter box 1, and the meters 2 are connected with the meter box 1 via a communication connection, too.

The meter box 1 comprises communication means for communicating via an IP protocol stack with the backend platform 3. The meter box 1 provides a front-end platform for the energy provider and controls the successive meters. It is possible that the meter box 1 and the meters 2 and 21 communicate with one another by one or more proprietary communication protocols. In such case, the meter box 1 provides a conversion between the proprietary communication protocols and the generic resources management protocol used by the backend platform 3.

The backend platform 3 comprises communication means for communicating via an IP protocol stack. The backend platform comprises frontends 31, 32 which are accessible for the energy provider and/or the subscribers of the power grid 5, e.g. via web-interfaces.

The communication between the meters and the meter box of a unit, for instance, between the meters 2 and 21 and the meter box 1, is carried out by means of power line communication or by means of a short-range wireless communication, like bluetooth or wlan (wlan=wireless local area network).

The communication between the units 4 and the backend platform 3 is carried out by means of a communication network providing an IP infrastructure, e.g. the internet. These communication links are indicated in FIG. 1 by double arrows.

Thereby, the meters 2, meter box 1 and the backend platform 3 communicate with one another on top of the IP protocol stack by means of a generic, bi-directional resource management protocol. Each of these interacting entities comprises communication means for communicating via the generic bi-directional resource management protocol and thereby encode and decode the data transferred via the resource management protocol according to a predefined extensible specification comprising a functional group for meter information and control. This predefined extensible specification describes the data structure which has to be used to transfer information as well as the meaning of the respective data element.

The following figures show various examples of data encoded according to this predefined extensible specification as well as of data elements of the functional group for meter information control exemplary filled with data. Therefore, the following figures show exemplary fragments of the data transferred via a generic bi-directional resource management protocol between at least two of the group of meter boxes 1, meters 2 and backend platforms 3 which is encoded and decoded, respectively, according to the predefined extensible specification. In the following, various examples of this predefined, extensible specification are given by hand of various embodiments, where the predefined extensible specification is already filled with concrete data values and thereby already represents a specification of data which is transferable over the communication network as part of the generic resource management protocol.

Each data element of the functional group can comprise one or more further data element so the predefined extensible specifications can comprise a hierarchy of successive data elements and each data element can be further specified by one or more attributes.

The functional group for meter information and control comprises a data element, e.g. "SpecificData", for specifying a meter, for instance the meters 2, and 21. This data element comprises a plurality of sub-data elements providing detailed data about the meter. For example, the data element "SpecificDetail" comprises the following data elements: A data element for specifying a meter ID (ID=identification) used to transfer a proprietary unique ID of each meter 2 for the recipient, which is, for instance preset by the producer of the meter. A data element specifying the medium measured by the meter, for instance gas, water, electricity or heating. A data element specifying a manufacturer and a type of the meter 2. A data element specifying an indication whether the meter 2 is a mobile device. A data element specifying a meter level or another indication of the position of the meter within the meter topology. A data element specifying a software/firmware version of the meter. A data element indicating whether the meter measures consumption and/or input of energy (into the power grid 5).

FIG. 2 shows an instance of a data element "SpecificData" exemplary filled with concrete data values.

The data element "MFCT" specifies the meter as manufactured by "Elster". The data elements "Type", "UniqueID", "Medium", "VersionID" and "Device" specify the type, the ID, the measured medium, the version and the consumption type of the meter. The data element "Mobile" specifies that the meter is mobile, e.g. used in rental apartments. The data element "Level" indicates the level in the hierarchy of a meter topology, for instance, a meter 2 has the ID 4 and is cascade behind a meter 2 with the ID 2, so the meter level could is 2.4.

FIG. 3 shows an instance of a data element "MeterEvent" exemplary filled with data values. The data element "MeterEvent" specifies events of the meter. A type of the event is specified by means of adding an attribute. A tamper event, e.g. the attribute "Tamper" indicates if there was a attempt of manipulation of the meter 2, 21. A value of the data element for specifying the meter events could even indicate the kind of manipulation, like meter manipulation, e.g. "MeterManipulation", communication manipulation, e.g. "CommunicationManipulation", other manipulation, e.g. "OtherManipulation" or no manipulation, e.g. "NoManipulation". Furthermore, the status event, e.g. the attribute "Status", specifies the status of the meter 2, such as "Active", "Defect" or "No reply". A supply event, e.g. the attribute "Supply" indicates an outage of supply, especially combined with "Home Automation" to realize sequential power up, like "Active", "Blackout", or an "other supply problem".

Further, the functional group for meter information and control comprises a data element specifying the prepayment or credit of a subscriber of the power grid 5. For instance, the available prepaid credit of the consumer 6. For example, the subscriber 6 can load a prepaid card with money and introduce it into the meter 2. For instance, this data element specifies the maximum value of consumption of energy, preferably in kWh, resulting from the money loaded on the prepayment card.

Further, a data element of the functional group for meter information and control comprises a data element that specifies inter meter communication (IMC=inter meter communication). This data element allows the transmission of the ID from a linked meter. This is in particular desirable when having separate meters on each floor or for maintaining a meter topology.

Furthermore, the functional group for meter information and control comprises a data element for counting previous reading accesses in the last month or year, for instance, labeled "Reading".

The FIGS. 4*a* and 4*b* show an example of a specification of a meter 2 using various of the aforementioned data elements of the functional group for meter information on control. Furthermore, the functional group for meter information and control comprises an extendable data element, for instance, named "data point" for specifying data transferable from and to the meter or meter boxes. The data element comprises an attribute, "Energy Total" for specifying the total measured energy, and attributes "Power", "Voltage", "Frequency" for specifying the measured power, voltage and frequency. Further, it is possible to specify attributes which enable the transfer of inter-meter and prepayment data by means of this data element, for instance, the attributes "IMC" and "Prepay".

Currently, there are two different tariffs, one for day current and one for night current. The introduction of an additional data element makes it possible to broaden the scale of tariffs and to avoid peaks of load in the power grid 5: Every meter 2 can have a display to inform a user at home about the status the meter 2, meter events, and/or other data and information communicated by means of the predefined extensible specification. For instance, the display indicates three values, namely The total energy, power and the current charge for the electricity. In particular it is necessary to submit or communicate at least the current charge from the backend platform 3 to the meter 2. The meter 2 itself stores the "TotalEnergy" and the power. FIG. 5 shows an example of a data element for transferring charge data from the backend platform 3 to the meter 2. The data element "datapoint" is extended by an attribute "charge" to transfer this information.

Furthermore, it is possible to transfer update data by means of a data element to the meter 2 or to the meter box 1. This feature is helpful in some cases, like software errors, new firmware, upgrades etc. FIG. 6 shows a specification of such exemplary filled data element "update" providing update information to the meter 2. FIG. 7 shows a specification of data element "update" providing update information to the meter box 1.

Further problems arise if the subscriber has a mobile energy consuming entity 61. The entity 61 is not directly fixed to a non-mobile meter 2. The mobile consumer 61 is linked to the non-mobile meter 2 through an interconnected mobile meter 21. The energy consumption of the mobile meter 21 has to be subtracted from the energy consumption measured by the meter 2 and has to be assigned to the subscriber of the mobile entity 61.

There are several possibilities to use such topology in practice, e.g.: electrically powered car loading, meter on different floors of a building, own meter for leaseholders. FIG. 8 shows an instance of a data element "IMC" (IMC=inter meter communication) for information forwarded between meters and exemplary filled with data values.

The combination of "Home Automation" and metering requires the introduction of a further functional group for home automation. This functional group comprises data elements for consumption detection and for device control.

FIG. 9 shows an instance data element "ConsumptionDetection", wherein the data element is exemplary filled with data values providing a consumption detection directed to the backend platform 3. The data element "ConsumptionDetection" comprises various data elements (see FIG. 9). It detects the consumption of single appliances by means of a further data element "Status" which can have the values: "0: active", "1: inactive" or "2: defect".

Furthermore, the functional group home automation comprises further data elements for device control, e.g. "Control" and "Setting".

FIG. 10 shows a data element "Setting" for device control exemplary filled with data values. For instance, a time management of the appliance is regulated by the backend platform 3. If the appliance should not further receive power via the power grid 5, the backend platform 3 sends a specification "<State>Off</State>", i.e. fills the data element "state" of the predefined extensible specification with the value "off". The function is a better kind of ripple control, since the outgoing part from the meter box 1 to the backend platform 2 is a task of the consumption detection.

FIG. 11 shows an examples of an application of a data element "Control" exemplary filled with data values. The data element "control" is a data element for device control. The device to be controlled is specified by means of an attribute of the data element "control", wherein in the first example "AirCondition" for an air condition and in the second example "Heating" for a heating is used. An other control condition in home automation is to control heating, ventilation and/or air condition. Heating and air condition should be controlled by a temperature sensor locally installed. But, the user should still have the opportunity to control the level manually. In the event of holidays or an absence on other reasons, the user should be able to phase down the heating, ventilation and/or air condition to a minimum. Home automation can take on this job analogous to the activation of appliances. Ventilation can be controlled by the appliance activation.

However, in order to manage the home temperature it is necessary to know the current temperature. Dependent on the current temperature, the backend platform 3 can activate the air condition or the heating. FIG. 12 shows a data element "Setting" exemplary filled with data values. In the example of FIG. 12 two air conditions and one heating is activated.

A further aspect of home automation are security systems, e.g. setting an alarm system for doors or windows. FIGS. 13 and 14 show two examples of the "Setting" data element exemplary filled with data values for device control to set the alarm system.

A data element "Central Lock" for device control to set a central lock, i.e. to activate the alarm system, lock the doors and windows or turn off appliances, is also available by the predefined extensible specification. This function can be activated by the backend platform 3 by a combination of the access control system, the alarm system and by turning appliances on or off.

In particular, any malfunction, also of single appliances, will be detected. A general malfunction is detected by means of data elements of the functional group for meter information and control of the predefined extensible specification concerning the meters 2, 21 or meter box 1. A malfunction detection of single appliances is included in the data element of consumption detection of the functional group for home automation of the predefined extensible specification.

Further, the functional group for home automation comprises a data element for controlling access. For example, an access control system for a facility or consumer 6 can be realized by means of a chipcard, a code or by a biometric access control, like fingerprint etc. The verification by means of data held on the backend platform 3 is in some cases difficult because of the sending time to the backend platform 3. Preferably, data for verification is stored on a local memory and the backend platform is used for user/password management. Furthermore, local access control units should be synchronized with the backend platform 3. FIGS. 15 and 16 show two examples of an instance data element "AccessControl" exemplary filled with data values for device control to set an alarm system. FIG. 15 shows exemplary an initiation of the alarm system by means of the data element "AccessControl". FIG. 16 shows exemplary a reporting of the alarm system by means of the data element "AccessControl", wherein the reporting of the alarm system is directed to the backend platform 3.

Preferably, the predefined extensible specification provides means to enable a sequential activation of appliance, e.g. after a blackout. Preferably by means of the "Control" and "Setting" data elements. Overload of the whole power grid 5 or unit 6 comprising a plurality of power consuming entities 6 can be prevented by means of turning on the single appliances, one by one.

It is also important to be able to access safety devices, e.g. gas alarm, fire alarm, water sensor, etc. This is, in particular, important if safety devices alert directly the responsible authorities, for instance a police, a fire service, and/or an emergency doctor. In such cases the communication means provide a real-time transmission via the communication network and/or the power grid 5. Locally, an alarm at the unit 4 and/or remotely at the backend platform 3 can be displayed at a display through an acoustical and/or an optical signal. Preferably, by means of the "Control" and "Setting" data element the foregoing is realized through an outgoing part of the alarm system.

FIG. 17 shows an instance of a data element "ConsumptionDetection" exemplary filled with data values for consumption detection. In this example the data element "ConsumptionDetection comprises a "Status" data element which is set to the value "1" indicating inactivity. The data element for consumption detection of the preferred extensible specification appliances can announce demand of energy, i.e. the extensible specification provides means for load/charge control of the appliances. To indicate such a demand of energy, a status field of the data element for consumption detection implies a corresponding status value, like "0" for "active", "1" for "inactive", "2" for "defect", or "3" for "demand".

FIGS. 18a and 18b, whereby FIG. 18b is the continuation of FIG. 18a, shows an example of specifying a meter by means of the data element "SpecificData" filled with exemplary data for the case that a consumer 6, e.g. a solar plant, is inputting energy into the power grid 5. The data element "SpecificData" comprises a data element "Device" with a value set to "Input". The "SpecificData" data element, i.e. the data element for specifying the meter 2, of the preferred extensible specification can also deal with entities 6 which do not only consume energy from the power grid 5, but also input energy in the power grid 5. For instance, if a subscriber maintains a solar plant, wind turbines, etc. Governments of many countries sponsor privately operated power generation.

In some situations, for example if there is a strong wind in the night, so that nobody uses the energy of the wind turbine, it could be necessary to disconnect the complete wind turbine/solar plant from the grid. FIG. 19 shows an example of a data element for device control to set a consumer 6, here a solar plant by means of the predefined extensible specification.

Finally, FIGS. 20a, 20b, 20c, 21a and 21b show an example of data transferred via the generic bi-directional resource management protocol filled with exemplary data values between the backend platform 3 and the meter box 1. The transferred data is encoded and decoded according to the predefined extensible specification. The presented example comprises all data elements introduced in the above described embodiments. The series of FIGS. 20a, 20b and 20c shows the wherein transferred data is sent from the backend platform 3 to the meter box 1, wherein the backend platform 3 encodes the transferred data and wherein the meter box 1 decodes, the transferred data, correspondingly. The series of FIGS. 21a and 21b shows an example of an opposite case, wherein the transferred data is sent from the meter box 1 to the backend platform 3, wherein the meter box 1 encodes the transferred data and wherein the backend platform 3 decodes correspondingly the transferred data.

The invention claimed is:

1. A method of remote metering of energy consumed and/or inputted by a plurality of energy consuming and/or inputting units of a power grid, wherein each unit comprises an energy consuming entity as well as at least one meter and/or a meter box connected with one or more meters, the method comprising:
   connecting the meter boxes and/or the meters with at least one backend platform via a communication network;
   electrically connecting the meters at one end with the power grid and at the other end with the energy consuming entities; and
   communicating between at least two of the group of meter boxes, meters and backend platforms by means of a generic bi-directional resource management protocol on top of an IP protocol stack via the communication network and thereby encoding and decoding data transferred via the resource management protocol according to a predefined extensible specification comprising a functional group for meter information and control;
   wherein the function group for meter information and control comprises a data element for connecting and disconnecting the unit from the power grid;
   wherein the extensible specification comprises a functional group for home automation;
   wherein the functional group for home automation comprises a data element for consumption detection and a data element for device control.

2. The method of remote metering of energy according to claim 1, wherein the functional group for meter information and control comprises
a data element for specifying a meter, and
a data element for specifying meter events.

3. The method of remote metering of energy according to claim 2, wherein the data element for specifying the meter comprises
a data element for specifying a medium measured by the meter to be one of electricity, gas, heating or water.

4. The method of remote metering of energy according to claim 2, wherein the data element for specifying the meter comprises
a data element indicating if the unit is a mobile unit.

5. The method of remote metering of energy according to claim 1, wherein the functional group for meter information and control comprises
an extendable data element for specifying data transferable from and to the meter, the extendable data element comprising successive data elements for at least one of measured power, voltage, frequency, total energy, inter meter communication, prepayment and/or charge.

6. The method of remote metering of energy according to claim 1, wherein the functional group for meter information and control comprises
an data element for inter mobile communication.

7. A device for remote metering of energy consumed and/or inputted by one of a plurality of energy consuming and/or inputting units of a power grid, wherein each unit comprises an energy consuming entity, and wherein the device for remote metering of energy consumed and/or inputted by one of the of energy consuming and/or inputting units of the power grid is at the one end electrically connected with the power grid and at the other end electrically connected with the energy consuming entities,
whereby the device comprises communication means is adapted to communicate via an communication network by means of a generic bi-directional resource management protocol on top of an IP protocol stack with a backend platform or with another device for remote metering of energy consumed and/or inputted by one of the plurality of energy consuming and/or inputting units of the power grid and thereby encode and decode the data transferred via the resource management protocol according to an predefined extensible specification comprising a functional group for meter information and control,
wherein the function group for meter information and control comprises a data element for connecting and disconnecting the unit from the power grid,
wherein the extensible specification comprises a functional group for home automation, and
wherein the functional group for home automation comprises a data element for consumption detection and a data element for device control.

8. The device according to claim 7, the functional group for meter information and control comprising:
a data element for specifying a meter; and
a data element for specifying meter events.

9. The device according to claim 8, the data element for specifying the meter comprising:
a data element indicating if the meter is a mobile meter.

10. A method for remote metering of energy in relation to a power grid, comprising:
providing at least one meter at a subscriber unit, each meter connected at one end to a power grid and at another end to at least one of an energy consuming entity and an energy generating entity, each meter adapted to measure energy provided by the power grid and consumed by the energy consuming entity and energy generated by the energy generating entity and provided to the power grid; and
communicating between the subscriber unit and a backend platform using an IP protocol stack via a communication network, wherein data transferred between the subscriber unit and the backend platform relates to energy consumed by the energy consuming entity and energy generated by the energy generating entity and is encoded and decoded using a generic bi-directional resource management protocol on top of the IP protocol stack, the generic bi-directional resource management protocol defined by a predefined extensible specification and comprising a first data element for connecting and disconnecting the at least one meter from the power grid, a second data element for consumption detection, and a third data element for device control.

11. The method according to claim 10, the generic bi-directional resource management protocol further comprising:
a fourth data element for specifying a meter; and
a fifth data element for specifying meter events.

12. The method according to claim 11, the generic bi-directional resource management protocol further comprising:
a sixth data element associated with the meter specified by the fourth data element, the sixth data element for specifying a medium measured by the corresponding meter to be one of electricity, gas, heating or water.

13. The method according to claim 11, the generic bi-directional resource management protocol further comprising:
a sixth data element associated with the meter specified by the fourth data element, the sixth data element for indicating if the corresponding meter is a mobile meter.

14. The method according to claim 10, the generic bi-directional resource management protocol further comprising:
an extendable data element for specifying data transferable from and to the subscriber unit, the extendable data element comprising successive data elements for at least one of measured power, voltage, frequency, total energy, inter meter communication, prepayment, and charge.

15. The method according to claim 10, the generic bi-directional resource management protocol further comprising:
a fourth data element for inter mobile communication.

16. An apparatus for remote metering of energy in relation to a power grid, comprising:
means for connecting on one end to a power grid;
means for connecting on another end to at least one of an energy consuming entity and an energy generating entity;
means for measuring energy provided by the power grid and consumed by the energy consuming entity and energy generated by the energy generating entity and provided to the power grid; and
means for communicating with a backend platform using an IP protocol stack via a communication network, wherein the data transferred to and from the backend platform relates to energy consumed by the energy consuming entity and energy generated by the energy generating entity and is encoded and decoded using a generic bi-directional resource management protocol on top of the IP protocol stack, the generic bi-directional resource management protocol defined by a predefined extensible specification and comprising a first data element for connecting and disconnecting to the power grid, a second data element for consumption detection, and a third data element for device control.

17. The apparatus according to claim 16, the generic bi-directional resource management protocol further comprising:
a fourth data element for specifying a meter; and
a fifth data element for specifying meter events.

18. The apparatus according to claim 17, the generic bi-directional resource management protocol further comprising:
a sixth data element associated with the meter specified by the fourth data element, the sixth data element for specifying a medium measured by the corresponding meter to be one of electricity, gas, heating or water.

19. The apparatus according to claim 17, the generic bi-directional resource management protocol further comprising:
a sixth data element associated with the meter specified by the fourth data element, the sixth data element for indicating if the corresponding meter is a mobile meter.

20. The apparatus according to claim 16, the generic bi-directional resource management protocol further comprising:
an extendable data element for specifying data transferable from and to the subscriber unit, the extendable data element comprising successive data elements for at least one of measured power, voltage, frequency, total energy, inter meter communication, prepayment, and charge.

* * * * *